(12) United States Patent
Chen

(10) Patent No.: US 11,042,966 B2
(45) Date of Patent: Jun. 22, 2021

(54) METHOD, ELECTRONIC DEVICE, AND STORAGE MEDIUM FOR OBTAINING DEPTH IMAGE

(71) Applicant: Guangdong Oppo Mobile Telecommunications Corp., Ltd., Guangdong (CN)

(72) Inventor: Yan Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/659,030

(22) Filed: Oct. 21, 2019

(65) Prior Publication Data

US 2020/0134784 A1 Apr. 30, 2020

(30) Foreign Application Priority Data

Oct. 24, 2018 (CN) .......................... 201811244125.3

(51) Int. Cl.
*G06T 3/40* (2006.01)
*G06T 5/00* (2006.01)
(Continued)

(52) U.S. Cl.
CPC .......... *G06T 3/4076* (2013.01); *G06T 3/4007* (2013.01); *G06T 5/002* (2013.01);
(Continued)

(58) Field of Classification Search
CPC . H04N 5/23235; G06T 3/4076; G06T 3/4007; G06T 5/002; G06T 5/50; G06T 2207/10028; G06T 2207/10024
See application file for complete search history.

(56) References Cited

U.S. PATENT DOCUMENTS 8,611,617 B1 * 12/2013 Baluja ................ G06K 9/00684
382/124
10,089,740 B2 10/2018 Srikanth et al.
(Continued)

FOREIGN PATENT DOCUMENTS

CN 102867288 A 1/2013
CN 105139355 A 12/2015
(Continued)

OTHER PUBLICATIONS

OA for EP application 19205000.3 dated Feb. 27, 2020.
(Continued)

*Primary Examiner* — Shawn S An

(57) ABSTRACT

The present disclosure provides a method, an electronic device, and a storage medium for obtaining a depth image. The method includes: mapping a depth image having a first resolution into a color image having a second resolution to obtain a processed image, the first resolution being smaller than the second resolution; establishing an objective function with respect to the processed image and a depth image having the second resolution, pixels in the processed image having one-to-one correspondence with pixels in the depth image having the second resolution, the objective function aiming to minimize an error with respect to the processed image and the depth image having the second resolution; and solving the objective function to obtain the depth image having the second resolution.

20 Claims, 12 Drawing Sheets

(51) Int. Cl.
*G06T 5/50* (2006.01)
*H04N 5/232* (2006.01)

(52) U.S. Cl.
CPC ............ *G06T 5/50* (2013.01); *H04N 5/23235* (2013.01); *G06T 2207/10024* (2013.01); *G06T 2207/10028* (2013.01)

(56) References Cited

U.S. PATENT DOCUMENTS

| | | | |
|---|---|---|---|
| 2005/0219554 A1* | 10/2005 | Tobiason | G01D 5/262 356/614 |
| 2011/0262002 A1* | 10/2011 | Lee | G06F 3/011 382/103 |
| 2011/0311143 A1* | 12/2011 | Cennini | G06K 9/00255 382/191 |
| 2012/0056982 A1* | 3/2012 | Katz | G06T 7/521 348/43 |
| 2012/0147205 A1 | 6/2012 | Lelescu et al. | |
| 2013/0107005 A1 | 5/2013 | Lim et al. | |
| 2014/0169701 A1 | 6/2014 | Cui | |
| 2014/0285623 A1* | 9/2014 | Bruls | H04N 13/128 348/43 |
| 2015/0049937 A1* | 2/2015 | Choi | G06T 3/4061 382/154 |
| 2016/0381341 A1* | 12/2016 | El Choubassi | H04N 13/122 348/43 |
| 2017/0132769 A1* | 5/2017 | Barron | G06K 9/6215 |
| 2017/0316602 A1* | 11/2017 | Smirnov | G06T 15/205 |
| 2018/0262744 A1* | 9/2018 | Tadi | H04N 13/139 |
| 2019/0079192 A1* | 3/2019 | Fenton | G01S 17/42 |
| 2019/0113606 A1* | 4/2019 | Mathy | H04N 13/128 |

FOREIGN PATENT DOCUMENTS

| | | | |
|---|---|---|---|
| CN | 106408513 A | 2/2017 | |
| CN | 106408524 A | 2/2017 | |
| CN | 106780383 A | 5/2017 | |
| CN | 107534764 A | 1/2018 | |
| CN | 108550167 A | 9/2018 | |
| WO | 2017079702 A1 | 5/2017 | |
| WO | WO-2018009423 A1 * | 1/2018 | ............ G01S 17/36 |

OTHER PUBLICATIONS

ISR for PCT application PCTCN 2019112732 dated Jan. 8, 2020.
India Office Action for IN Application 201914042115 dated Mar. 1, 2021. (5 pages).

* cited by examiner

METHOD, ELECTRONIC DEVICE, AND STORAGE MEDIUM FOR OBTAINING DEPTH IMAGE

CROSS-REFERENCE TO RELATED APPLICATION(S)

This application claims priority to Chinese Patent Application No. 201811244125.3, filed on Oct. 24, 2018, the entire contents of which are incorporated herein by reference.

TECHNICAL FIELD

The present disclosure relates to image processing technologies, and more particularly, to a method, an apparatus, an electronic device, and a computer readable storage medium for obtaining a depth image.

BACKGROUND

In the related art, due to an area of a chip and power consumption, a depth image formed by a depth acquisition component has a low resolution. It is difficult to satisfy a user's requirements by employing a depth image with a lower resolution, for example, an absence of surface texture details of a generated three-dimensional model, a reduction in an accuracy of face recognition, etc.

SUMMARY

A method for obtaining a depth image according to an embodiment of the present disclosure includes: mapping a depth image having a first resolution into a color image having a second resolution to obtain a processed image, the first resolution being smaller than the second resolution; establishing an objective function with respect to the processed image and a depth image having the second resolution, pixels in the processed image having one-to-one correspondence with pixels in the depth image having the second resolution, the objective function aiming to minimize an error with respect to the processed image and the depth image having the second resolution; and solving the objective function to obtain the depth image having the second resolution.

An electronic device according to an embodiment of the present disclosure includes a memory and a processor. The memory is configured to store instructions. The processor is configured to read the instructions to carry out the method described above.

A computer readable storage medium according to an embodiment of the present disclosure includes a computer program used in combination with the electronic device. The computer program may be executed by a processor of the electronic device to perform the method described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the accompanying drawings.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are examples, are merely used to explain the present disclosure, and cannot be construed as a limit to the present disclosure.

Figure 1:
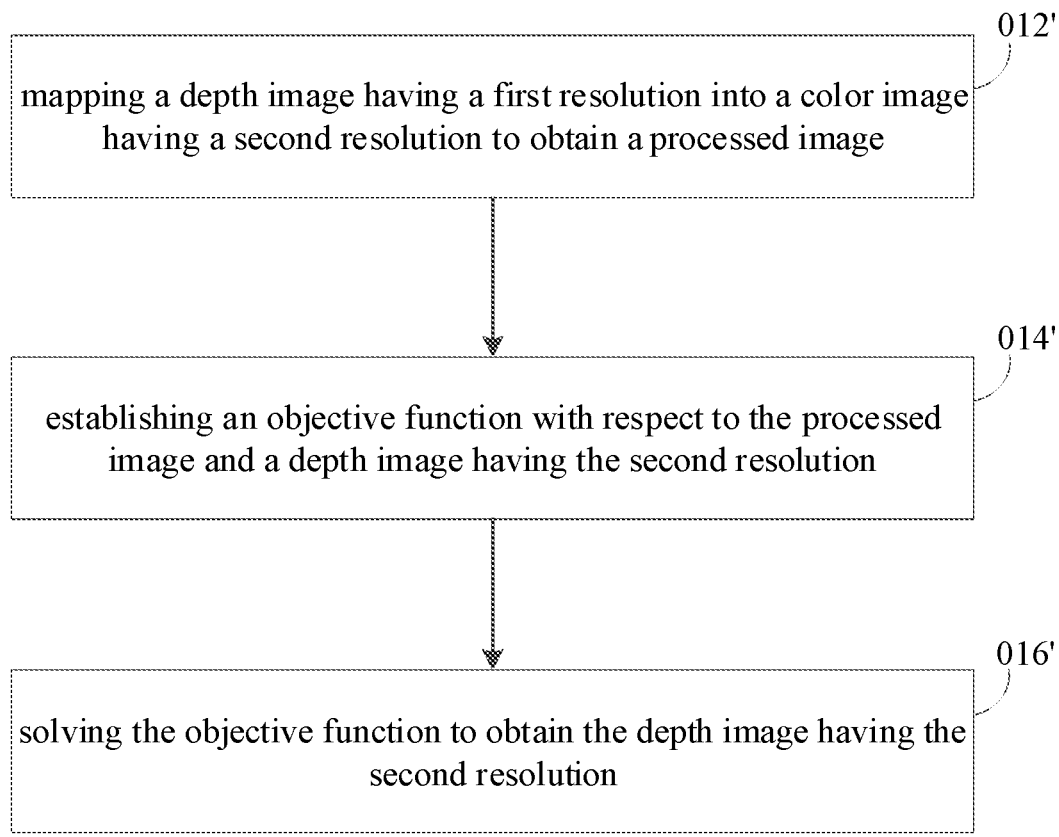
FIG. 1 is a flowchart of a method for obtaining a depth image according to some embodiments of the present disclosure.

Referring to FIG. 1, a method for obtaining a depth image according to embodiments of the present disclosure includes acts in the following blocks.

At block 012', a depth image having a first resolution is mapped into a color image having a second resolution to obtain a processed image. The first resolution is smaller than the second resolution.

At block 014', an objective function with respect to the processed image and a depth image having the second resolution is established. Pixels in the processed image have one-to-one correspondence with pixels in the depth image having the second resolution. The objective function aims to minimize an error with respect to the processed image and the depth image having the second resolution.

At block 016', the objective function is solved to obtain the depth image having the second resolution.

Figure 2:
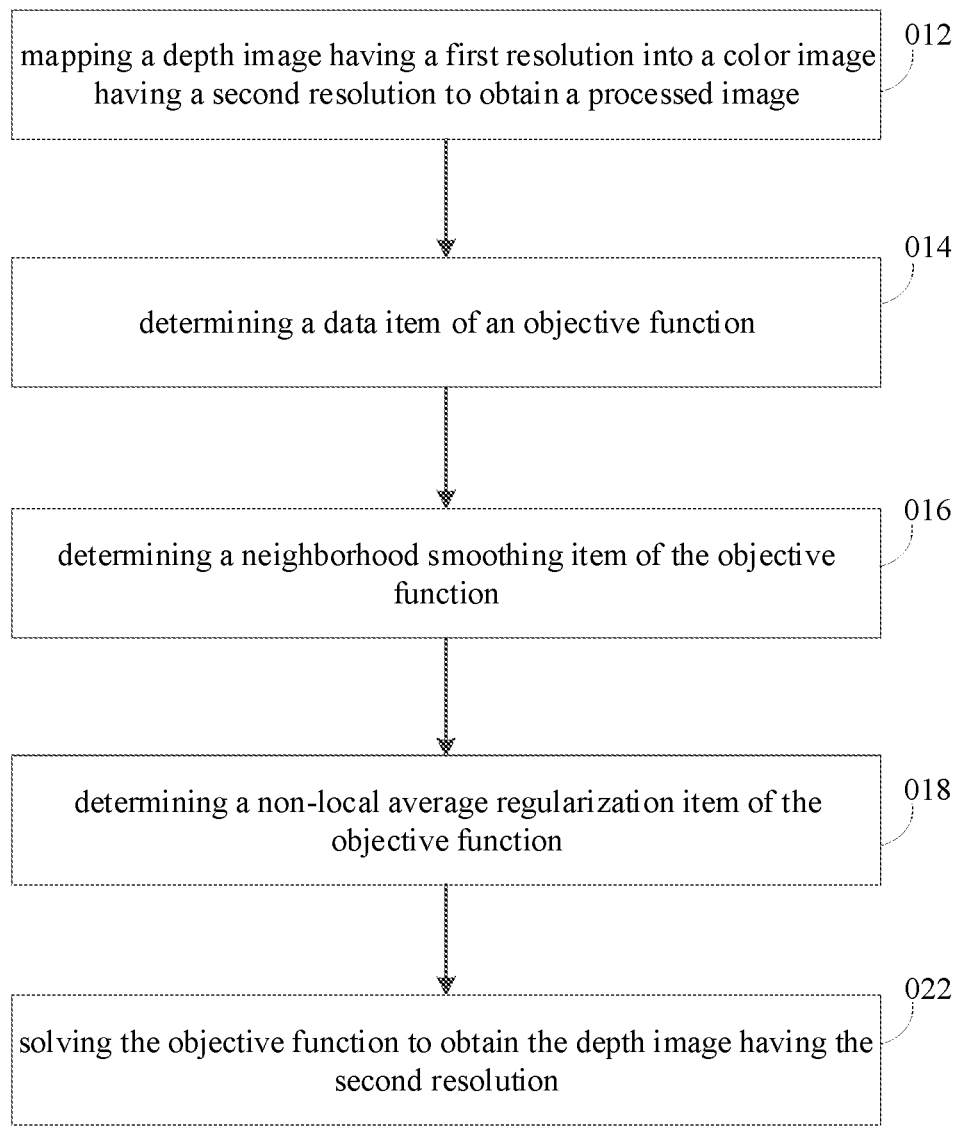
FIG. 2 is a flowchart of a method for obtaining a depth image according to some embodiments of the present disclosure.

The embodiments of the present disclosure are described in detail below. Referring to FIG. 2, a method for obtaining a depth image according to embodiments of the present disclosure includes acts in the following blocks.

At block 012, a depth image having a first resolution is mapped into a color image having a second resolution to obtain a processed image. The depth image and the color image correspond to the same scene. The first resolution is smaller than the second resolution. The processed image includes a plurality of first pixels and a plurality of second pixels. Each of the plurality of first pixels includes color information and depth information, and each of the plurality of second pixels includes color information. The depth information corresponds to the depth image having the first resolution. The color information corresponds to the color image.

At block 014, a data item of an objective function is determined based on the depth information of the plurality of first pixels in the processed image and depth information of a plurality of pixels corresponding to the plurality of first pixels in the depth image having the second resolution. The depth image having the second resolution includes depth information.

At block 016, a neighborhood smoothing item of the objective function is determined based on depth information of the plurality of first pixels in the processed image, and depth information of pixels in a first neighborhood corresponding to each of the plurality of first pixels in the depth image having the second resolution.

In an embodiment, the neighborhood smoothing item may be multiplied by a first weight. The first weight is determined based on the color information of the plurality of first pixels in the processed image and color information of pixels in the first neighborhood of each of the plurality of first pixels in the processed image.

At block 018, a non-local average regularization item of the objective function is determined based on depth information of the plurality of first pixels in the processed image, and depth information of pixels in a second neighborhood corresponding to each of the plurality of first pixels in the depth image having the second resolution.

At block 022, the objective function is solved to obtain the depth image having the second resolution.

Figure 3:
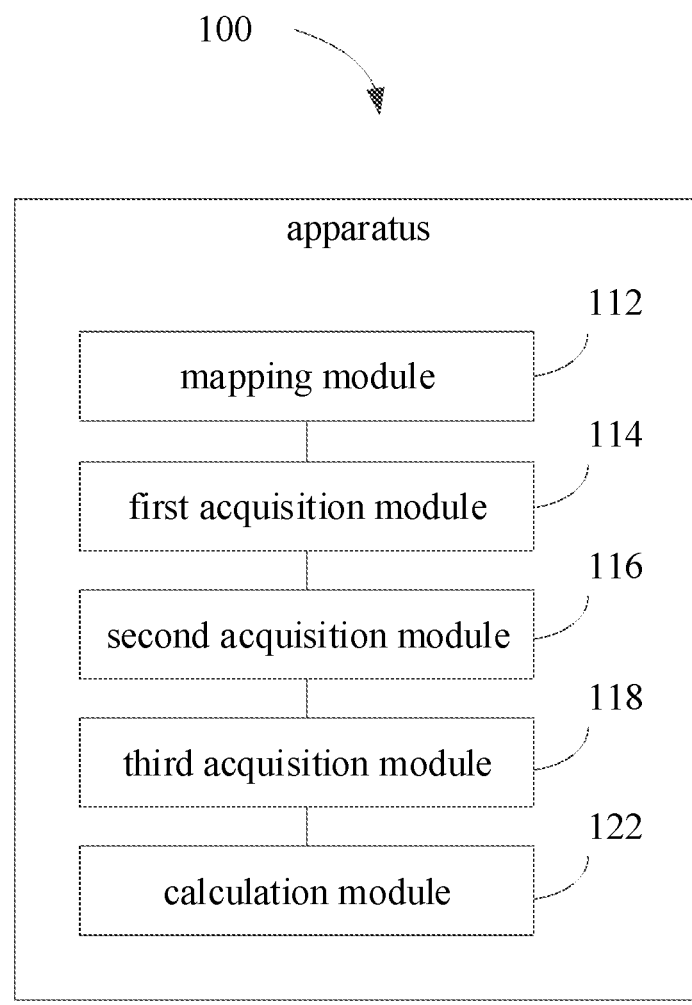
FIG. 3 is a block diagram of an apparatus for obtaining a depth image according to some embodiments of the present disclosure.

Referring to FIG. 3, an apparatus 100 for obtaining a depth image according to embodiments of the present disclosure includes a mapping module 112, a first acquisition module 114, a second acquisition module 116, a third acquisition module 118, and a calculation module 122. The method for obtaining a depth image according to embodiments of the present disclosure may be implemented by the apparatus 100 according to embodiments of the present disclosure. The act in block 012 may be realized by the mapping module 112. The act in block 014 may be realized by the first acquisition module 114. The act in block 016 may be realized by the second acquisition module 116. The act in block 018 may be realized by the third acquisition module 118. The act in block 022 may be realized by the calculation module 122. That is, the mapping module 112 is configured to map a depth image having a first resolution into a color image having a second resolution to obtain a processed image. The depth image and the color image correspond to the same scene. The first resolution is smaller than the second resolution. The processed image includes a plurality of first pixels and a plurality of second pixels. Each of the plurality of first pixels includes color information and depth information, and each of the plurality of second pixels includes color information. The first acquisition module 114 is configured to determine a data item of an objective function based on the depth information of the plurality of first pixels in the processed image and depth information of a plurality of pixels corresponding to the plurality of first pixels in the depth image having the second resolution. The depth image having the second resolution includes depth information. The second acquisition module 116 is configured to determine a neighborhood smoothing item of the objective function based on depth information of the plurality of first pixels in the processed image, and depth information of pixels in a first neighborhood corresponding to each of the plurality of first pixels in the depth image having the second resolution. In an embodiment, the neighborhood smoothing item may be multiplied by a first weight. The first weight is determined based on the color information of the plurality of first pixels in the processed image and color information of pixels in the first neighborhood of each of the plurality of first pixels in the processed image. The third acquisition module 118 is configured to determine a non-local average regularization item of the objective function based on depth information of the plurality of first pixels in the processed image, and depth information of pixels in a second neighborhood corresponding to each of the plurality of first pixels in the depth image having the second resolution. The calculation module 122 is configured to solve the objective function to obtain the depth image having the second resolution.

Figure 4:
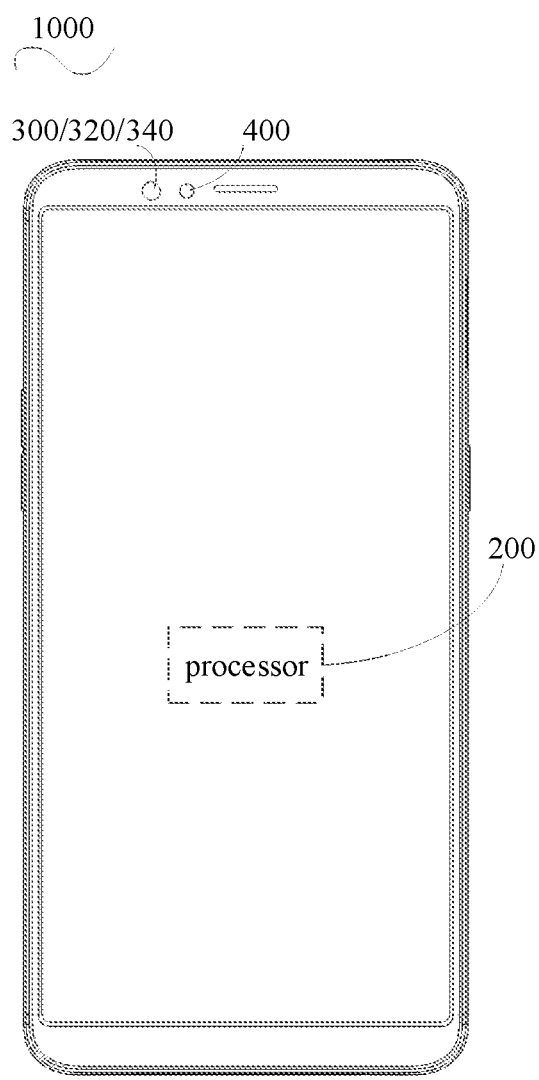
FIG. 4 is a schematic diagram of an electronic device according to some embodiments of the present disclosure.

Referring to FIG. 4, an electronic device 1000 according to embodiments of the present disclosure includes a processor 200. The method for obtaining a depth image according to embodiments of the present disclosure may be implemented by the electronic device 1000 according to embodiments of the present disclosure. The acts in blocks 012, 014, 016, 018, and 022 may be realized by the processor 200. That is, the processor 200 is configured to: map a depth image having a first resolution into a color image having a second resolution to obtain a processed image, the depth image and the color image corresponding to the same scene, the first resolution being smaller than the second resolution, the processed image including a plurality of first pixels and a plurality of second pixels, each of the plurality of first pixels including color information and depth information, and each of the plurality of second pixels including color information; determine a data item of an objective function based on the depth information of the plurality of first pixels in the processed image and depth information of a plurality of pixels corresponding to the plurality of first pixels in the depth image having the second resolution, the depth image having the second resolution including depth information; determine a neighborhood smoothing item of the objective function based on depth information of the plurality of first pixels in the processed image, and depth information of pixels in a first neighborhood corresponding to each of the plurality of first pixels in the depth image having the second resolution, the first weight being determined based on the color information of the plurality of first pixels in the processed image and color information of pixels in the first neighborhood of each of the plurality of first pixels in the processed image; determine a non-local average regularization item of the objective function based on depth information of the plurality of first pixels in the processed image, and depth information of pixels in a second neighborhood corresponding to each of the plurality of first pixels in the depth image having the second resolution; and solve the objective function to obtain the depth image having the second resolution.

The method for obtaining a depth image, the apparatus 100 for obtaining a depth image, and the electronic device 1000 according to embodiments of the present disclosure may perform upsampling processing on the depth image having the first resolution to obtain the depth image having the second resolution, thereby increasing the resolution of the depth image, and further satisfying the user's requirements, for example, surface texture details of the generated three-dimensional model are more detailed, the accuracy of face recognition is higher, etc. In addition, the neighborhood smoothing item may improve continuity in depth in the depth image having the second resolution, and the non-local average regularization item may maintain a local structure of the depth image having the second resolution.

In an embodiment, the first resolution is, for example, 240*180, and the second resolution is, for example, 2 k resolution (for example, 2560*1440) or 4 k resolution (4096*2160). Of course, the first resolution and the second resolution may be of other choices, and are not specifically limited herein.

The electronic device 1000 may be a mobile phone, a tablet computer, a smart wearable device (a smart watch, a smart wristband, smart glasses, a smart helmet, etc.), a drone, and on the like, which is not limited herein.

In some implementations, the electronic device 1000 further includes a depth acquisition component 300. The depth acquisition component 300 may be configured to acquire a depth image. The depth acquisition component 300 may be, for example, a time-of-flight (TOF) camera component 320 or a structured-light camera component 340.

The TOF camera component 320 includes a light emitter and a light receiver. The light emitter is configured to emit light to a target object. The light receiver is configured to receive light reflected by the target object and sample repeatedly to obtain a plurality of phase maps. A phase difference $$\varphi = \arctan\left(\frac{Q_3 - Q_4}{Q_2 - Q_1}\right)$$

of emitted light and reflected light may be calculated by the plurality of phase maps, where $Q_1$, $Q_2$, $Q_3$ and $Q_4$ are pixel values of corresponding pixels in four phase maps. Consequently, depth information (i.e., a depth value, such as a distance value d) may be obtained by a formula of $$d = \frac{c}{2f} \cdot \frac{\varphi}{2\pi}$$

to form a depth image, where c represents the speed of light, and f represents the light-emitting frequency of the laser.

The structured-light camera component 340 includes a structured-light projector and an image sensor. After structured light projected by the structured-light projector is modulated by the target object, the image sensor captures an image of the structured light modulated by the target object, and thus the depth information is obtained by demodulating phase information corresponding to each pixel of the structured-light image to form a depth image.

In some implementations, the electronic device 1000 includes a visible-light acquisition component 400. The visible-light acquisition component 400 is configured to acquire a color image. The color image includes color information such as RGB information, YUV information, and the like.

Figure 5:
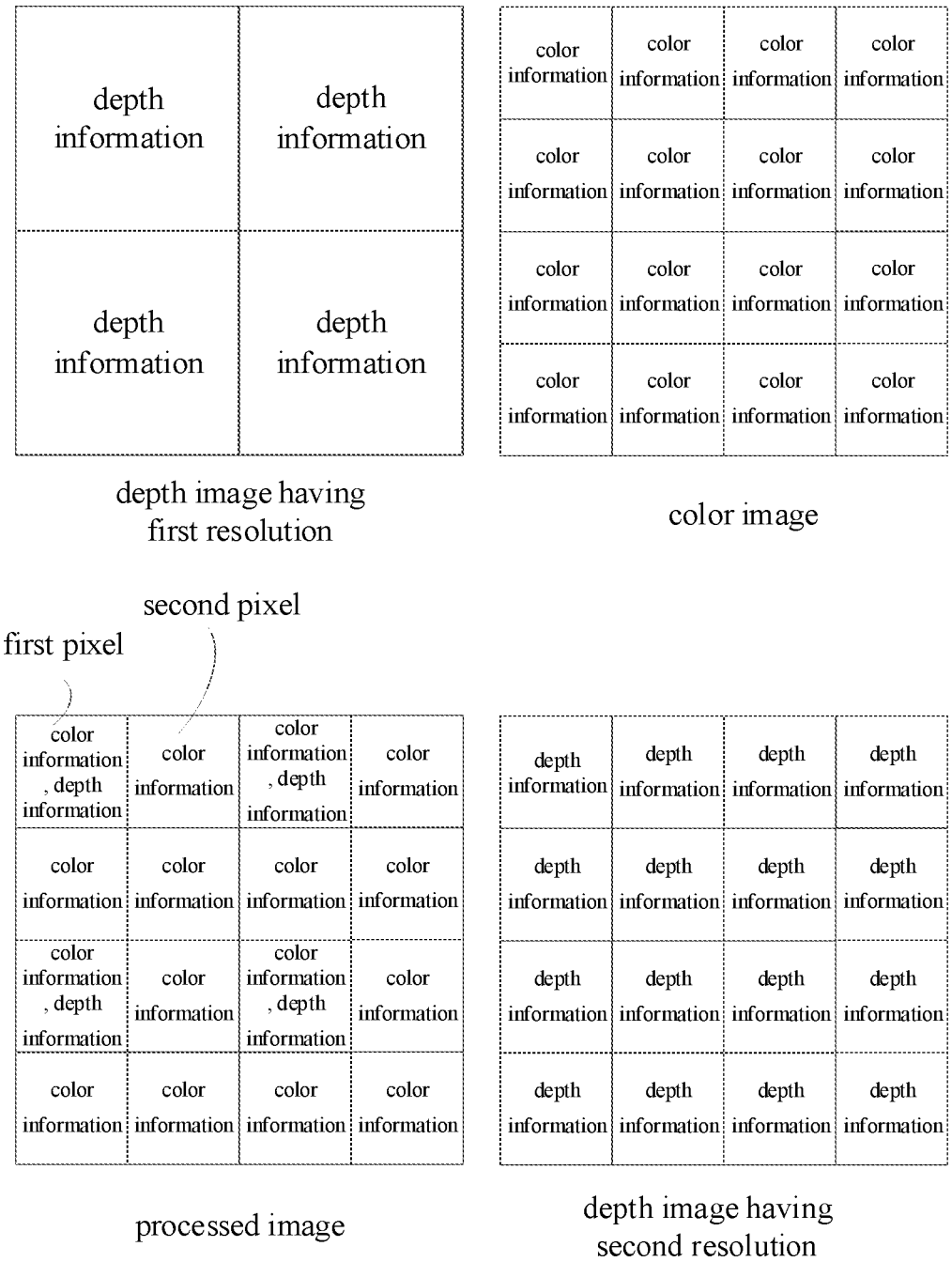
FIG. 5 is a schematic diagram of a depth image having a first resolution, a color image, a processed image, and a depth image having a second resolution according to some embodiments of the present disclosure.

Referring to FIG. 5, the depth image is mapped into the color image. In detail, external parameters from the depth acquisition component 300 to the visible-light acquisition component 400 are calculated based on camera calibration of the depth acquisition component 300 and the visible-light camera component 400, and the external parameters are employed to obtain a depth image and a color image in the same coordinate system. The depth image includes depth information and the color image includes color information. The processed image is obtained through combining the mapped depth image with the mapped color image. Since the first resolution is smaller than the second resolution, only some of the pixels (i.e., the plurality of first pixels) in the processed image include depth information (corresponding to the depth information of the depth image). Both the plurality of first pixels and the plurality of second pixels include color information (corresponding to the color information of the color image).

Figure 6:
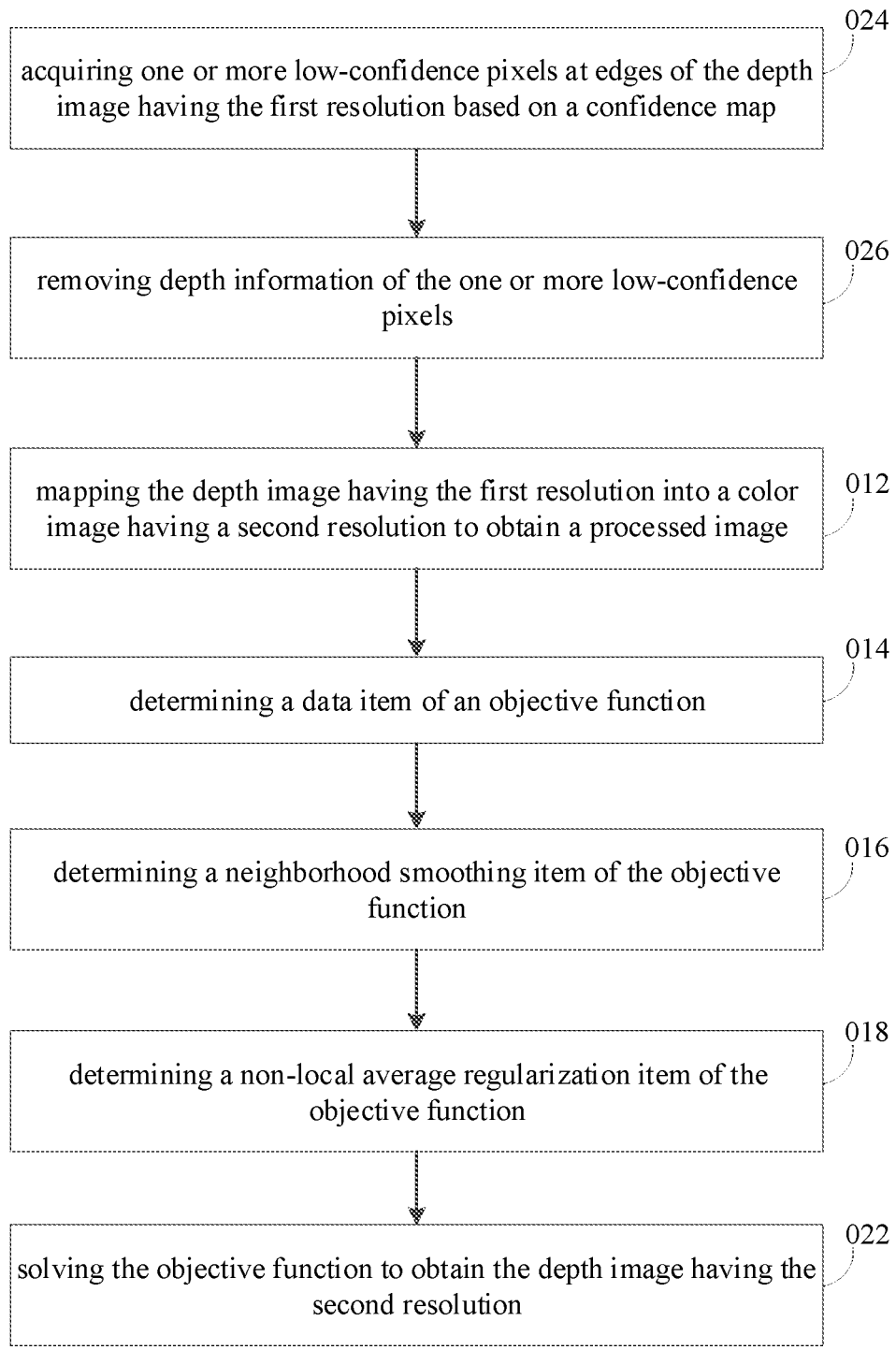
FIG. 6 is a flowchart of a method for obtaining a depth image according to some embodiments of the present disclosure.

Referring to FIG. 6, in some implementations, before the act in block 014, the method for obtaining a depth image further includes the acts in the following blocks.

At block 024, one or more low-confidence pixels at edges of the depth image having the first resolution are acquired based on a confidence map.

At block 026, depth information of the one or more low-confidence pixels is removed.

Figure 7:
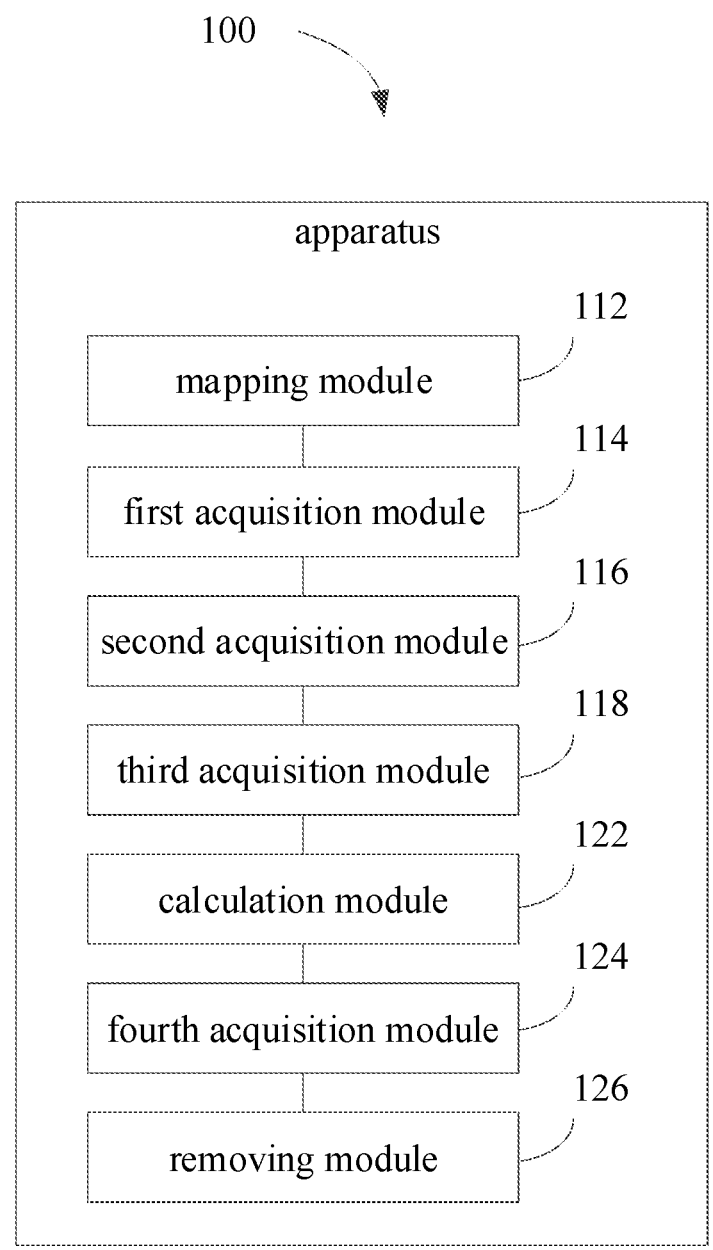
FIG. 7 is a block diagram of an apparatus for obtaining a depth image according to some embodiments of the present disclosure.

Referring to FIG. 7, in some implementations, the apparatus 100 further includes a fourth acquisition module 124 and a removing module 126. The act in block 024 may be realized by the fourth acquisition module 124, and the act in block 026 may be realized by the removing module 126. That is, the fourth acquisition module 124 may be configured to obtain one or more low-confidence pixels at edges of the depth image having the first resolution based on the confidence map. The removing module 126 may be configured to remove the depth information of the one or more low-confidence pixels.

Referring again to FIG. 4, in some implementations, the act in block 024 and the act in block 026 may be realized by the processor 200. That is, the processor 200 may also be configured to: obtain one or more low-confidence pixels at edges of the depth image having the first resolution based on a confidence map; and remove depth information of the one or more low-confidence pixels.

There is more noise at edges of the depth image, and errors in depth information of the edges are larger. Consequently, low-confidence pixels at edges of the depth image may be filtered out by a confidence map to filter out noise. In detail, the confidence map and the depth image are in a one-to-one correspondence relation, and a confidence threshold may be set. The confidence threshold may be compared with pixel values of edge pixels corresponding to edges of the depth image in the confidence map. When the pixel values of the edge pixels are greater than or equal to the confidence threshold, it is determined that the confidence of the pixels corresponding to the edge pixels in the depth image is relatively high. When the pixel values of the edge pixels are less than the confidence threshold, it is determined that the confidence of the pixels (low-confidence pixels) corresponding to the edge pixels in the depth image is relatively low. Given that pixels with low confidence have higher errors, the depth information of pixels with low confidence may be removed to filter out the noise in the depth image, such that a subsequent process of obtaining the depth image having the second resolution may not be affected by the noise of the low-confidence pixels, making the depth image having the second resolution more accurate.

An edge of the depth image may be obtained through an edge detection method such as thresholding, a gray-scale image, Sobel operator and canny operator, and no specific limitation is made herein.

In some implementations, all of the edges of the depth image obtained from detection may be removed, such that noise in the depth image may be filtered out quickly.

In some implementations, the acts in blocks 024 and 026 may be implemented before the act in block 012. That is, after filtering out the noise in the depth image, the depth image is mapped into the color image to obtain the processed image, thereby preventing the noise in the depth image from being transmitted to the processed image, and then being transmitted to the depth image through the processed image.

In some implementations, the acts in blocks 0264 and 026 may be implemented after the act in block 012. That is, after the depth image is mapped into the color image to obtain the processed image, the depth information of the first pixel corresponding to the low-confidence pixel in the processed image is removed, and the first pixel with the depth information removed may be regarded as the second pixel. In this manner, the complete depth image may be easily mapped into the color image to obtain the processed image, and then the noise in the processed image is filtered out.

Figure 8:
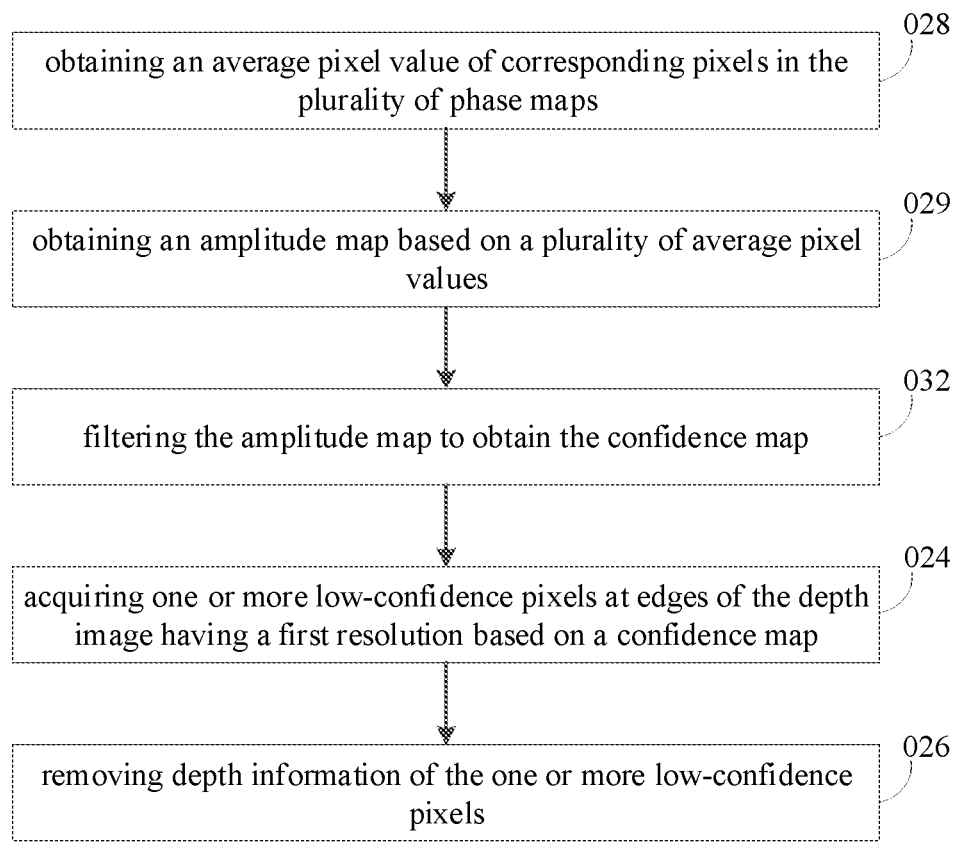
FIG. 8 is a flowchart of a method for obtaining a depth image according to some embodiments of the present disclosure.

Referring to FIG. 8, in some implementations, the depth image having the first resolution is obtained by the TOF camera component 320. The TOF camera component 320 is configured to sample repeatedly to obtain a plurality of phase maps. The depth image having the first resolution is obtained by processing the plurality of phase maps. The method for obtaining a depth image includes acts in the following blocks.

At block 028, an average pixel value of corresponding pixels in the plurality of phase maps is obtained.

At block 029, an amplitude map is obtained based on a plurality of average pixel values.

At block 032, the amplitude map is filtered to obtain the confidence map.

Figure 9:
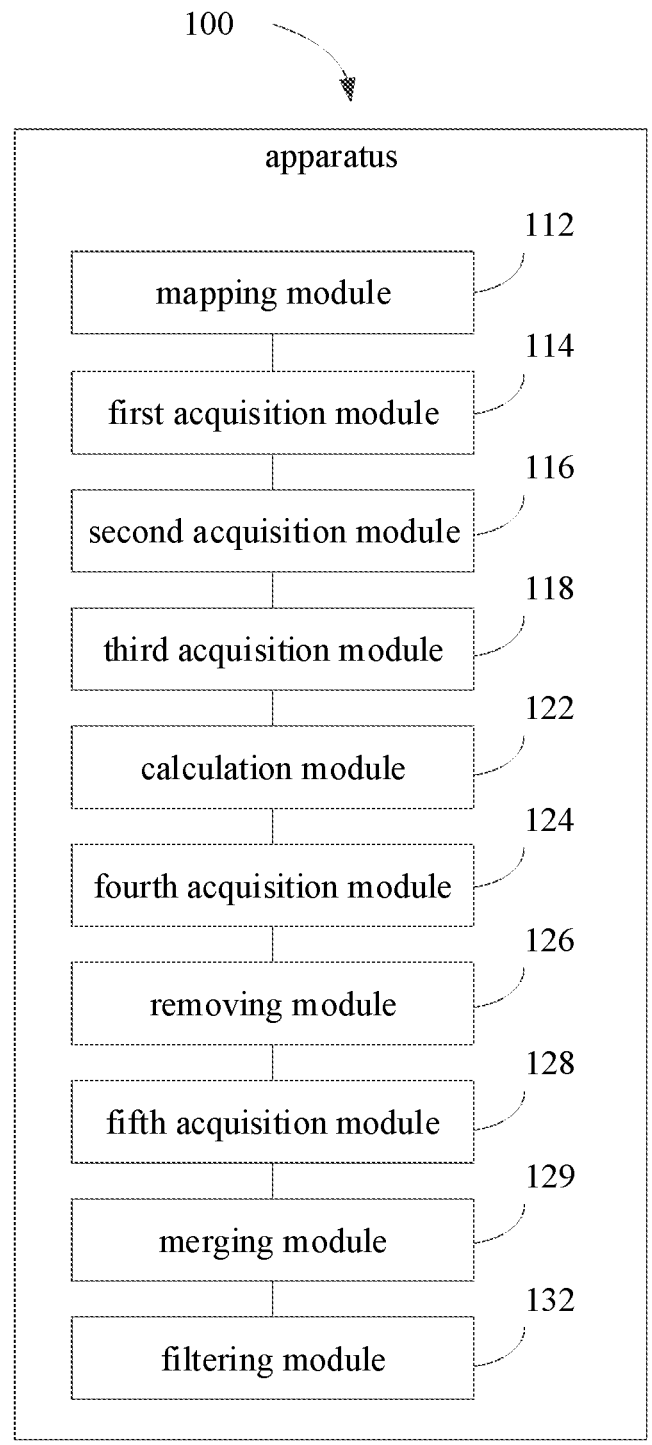
FIG. 9 is a block diagram of an apparatus for obtaining a depth image according to some embodiments of the present disclosure.

Referring to FIG. 9, in some implementations, the depth image having the first resolution is obtained by the TOF camera component 320. The TOF camera component 320 is configured to sample repeatedly to obtain the plurality of phase maps. The depth image having the first resolution is obtained by processing the plurality of phase maps. The image processing apparatus 100 includes a fifth acquisition module 128, a merging module 129, and a filtering module 132. The act in block 028 may be realized by the fifth acquisition module 128. The act in block 029 may be realized by the merging module 129. The act in block 032 may be realized by the filtering module 132. That is, the fifth acquisition module 128 may be configured to obtain an average pixel value of corresponding pixels in the plurality of phase maps. The merging module 129 may be configured to obtain the amplitude map based on the plurality of average pixel values. The filtering module 132 may be configured to filter the amplitude map to obtain the confidence map.

Referring again to FIG. 4, in some implementations, the depth image having the first resolution is obtained by the TOF camera component 320. The TOF camera component 320 is configured to sample repeatedly to obtain the plurality of phase maps. The depth image having the first resolution is obtained by processing the plurality of phase maps. The acts in blocks 028, 029 and 032 may be realized by the processor 200. That is, the processor 200 may be configured to: obtain an average pixel value of corresponding pixels in the plurality of phase maps; obtain the amplitude map based on a plurality of average pixel values; and filter the amplitude map to obtain the confidence map.

In detail, the plurality of phase maps are in a one-to-one correspondence relation with each other. An average value of pixel values of corresponding pixels in four phase maps may be acquired and regarded as the average pixel value. For example, the average pixel value $$Q = \frac{Q_1 + Q_2 + Q_3 + Q_4}{4},$$

where $Q_1$, $Q_2$, $Q_3$ and $Q_4$ are pixel values of corresponding pixels in the four phase maps. The amplitude maps and the phase maps are also in a one-to-one correspondence relation. Since the average pixel value is regarded as the pixel value of a corresponding pixel in the amplitude map, the amplitude map may be obtained through obtaining pixel values of all of the pixels in the amplitude map.

Since there may be noise in the phase map, there may also be noise in the amplitude map obtained from the phase map. Consequently, the amplitude map may be filtered to obtain the confidence map, such that the confidence map is more accurate. A more accurate confidence map may be employed to obtain low-confidence pixels more accurately, and the depth information of the low-confidence pixels may be removed to filter out the noise. Gaussian filtering may be employed to filter the amplitude map to obtain the confidence map.

In some implementations, after filtering the amplitude map to obtain the confidence map, the maximum-confidence pixel value in the confidence map may further be obtained. And then, an updated confidence map is obtained through comparing each pixel value in the confidence map with the maximum-confidence pixel value. The low-confidence pixels are obtained based on the updated confidence map. The range of each pixel value of the updated confidence map is [0, 1]. Consequently, it is more convenient to set the confidence threshold and to compare the pixel values of the updated confidence map with the confidence threshold, thereby obtaining the low-confidence pixels more accurately and quickly.

In some implementations, each pixel value of the confidence map may be compared with the maximum-confidence pixel value through dividing each pixel value of the confidence map by the maximum-confidence pixel value.

Figure 10:
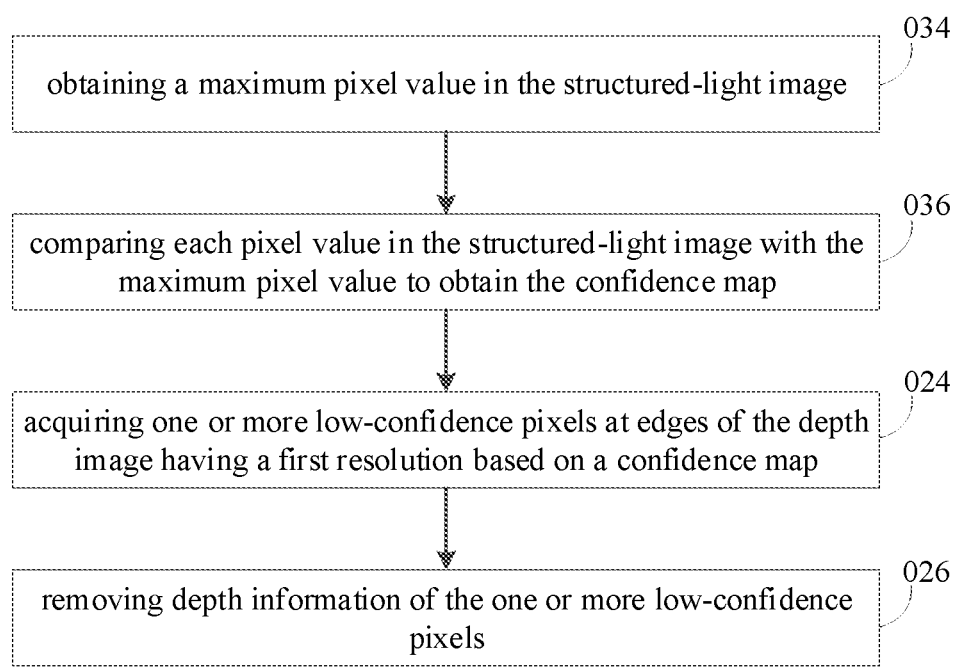
FIG. 10 is a flowchart of a method for obtaining a depth image according to some embodiments of the present disclosure.

Referring to FIG. 10, in some implementations, the depth image having the first resolution is obtained by the structured-light camera component 340. The structured-light camera component 340 is configured to acquire a structured-light image. The depth image having the first resolution is obtained by processing the structured-light image. The method for obtaining a depth image includes acts in the following blocks.

At block 034, a maximum pixel value in the structured-light image is obtained.

At block 036, each pixel value in the structured-light image is compared with the maximum pixel value to obtain the confidence map.

Figure 11:
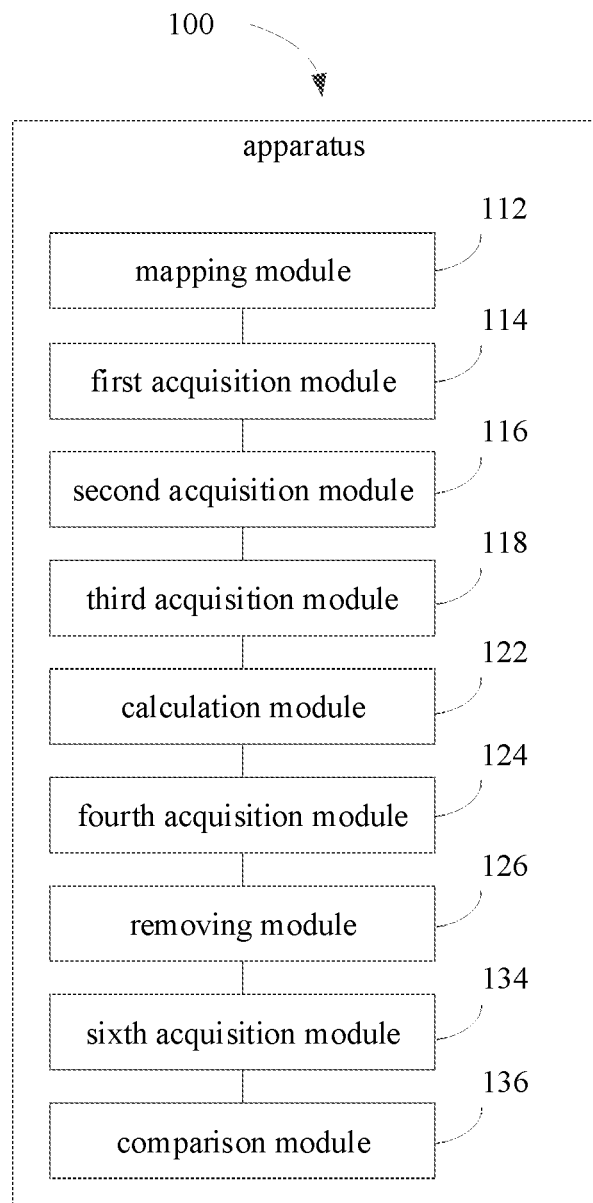
FIG. 11 is a block diagram of an apparatus for obtaining a depth image according to some embodiments of the present disclosure.
Figure 12:
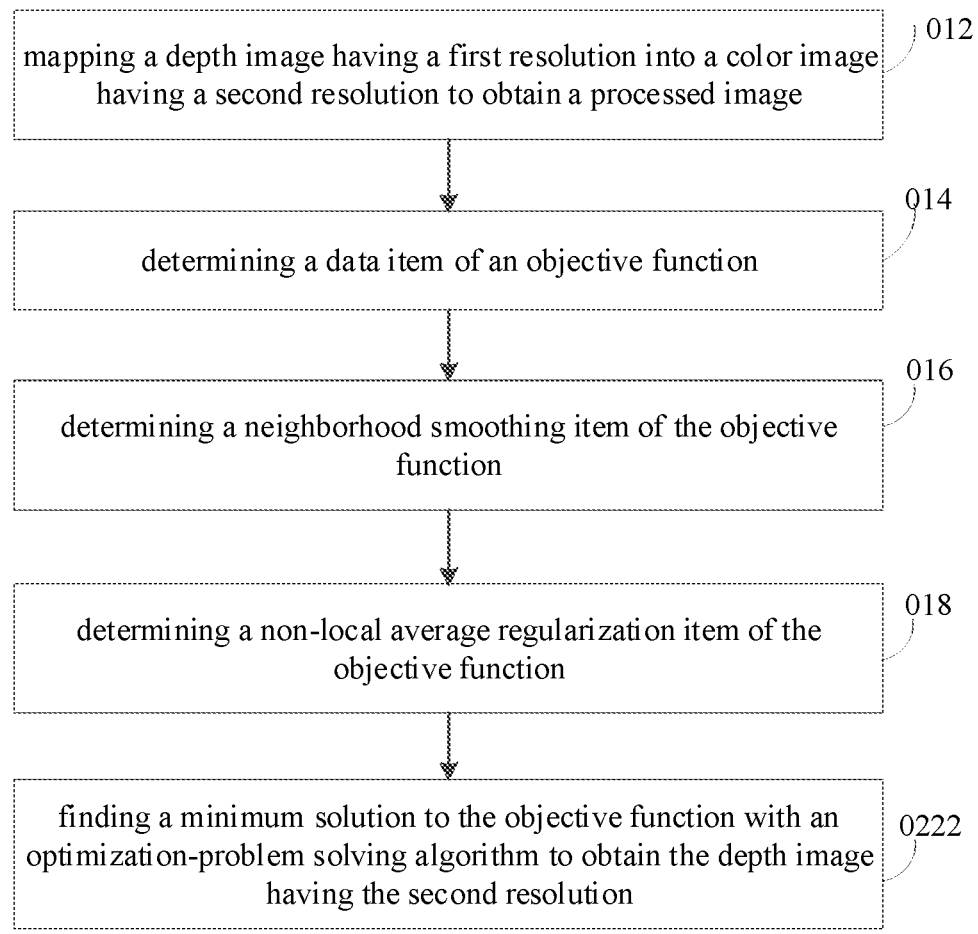
FIG. 12 is a flowchart of a method for obtaining a depth image according to some embodiments of the present disclosure.

Referring to FIG. 11, in some implementations, the depth image having the first resolution is obtained by the structured-light camera component 340. The structured-light camera component 340 is configured to acquire a structured-light image. The depth image having the first resolution is obtained by processing the structured-light image. The image processing apparatus 100 includes a sixth acquisition module 134 and a comparison module 136. The act in block 034 may be realized by the sixth acquisition module 134, and the act in block 036 may be realized by the comparison module 136. That is, the sixth acquisition module 134 may be configured to obtain a maximum pixel value in the structured-light image. The comparison module 136 may be configured to compare each pixel value in the structured-light image with the maximum pixel value to obtain the confidence map.

Referring again to FIG. 4, in some implementations, the depth image having the first resolution is obtained by the structured-light camera component 340. The structured-light camera component 340 is configured to acquire a structured-light image. The depth image having the first resolution is obtained by processing the structured-light image. The acts in blocks 034 and 036 may be realized by the processor 200. That is, the processor 200 may be configured to: obtain a maximum pixel value in the structured-light image; and compare each pixel value in the structured-light image with the maximum pixel value to obtain the confidence map.

In detail, comparing each pixel value of the structured-light image with the maximum pixel value may be performed by dividing each pixel value of the structured-light image by the maximum pixel value. The range of each pixel value of the confidence map obtained from the structured-light image is [0, 1]. Consequently, it is convenient to set the confidence threshold and to compare the pixel value of the confidence map with the confidence threshold, thereby obtaining the low-confidence pixels accurately and quickly.

In some embodiments, the objective function is denoted by a formula of $E(D)=E_d(D)+\lambda_s E_s(D)+\lambda_N E_{NLM}(D)$, where $E(D)$ denotes the objective function, $E_d(D)$ denotes the data item, $E_s(D)$ denotes the neighborhood smoothing item, $E_{NLM}(D)$ denotes the non-local average regularization item, $\lambda_s$ denotes a preset third weight, and $\lambda_N$ denotes a preset fourth weight. $\lambda_s$ and $\lambda_N$ may be obtained based on experiments and pre-stored in a relevant storage element.

In some implementations, the data item is denoted by a formula of $$E_d(D) = \sum_{p \in P} (D(p) - G(p))^2,$$

where p denotes a current pixel, P denotes a set of the plurality of first pixels, D(p) denotes depth information of the pixel p in the processed image, G(p) denotes depth information of a pixel corresponding to the pixel p in the depth image having the second resolution.

In some implementations, the neighborhood smoothing item is denoted by a formula of $$E_s(D) = \sum_{p \in P} \sum_{q \in N(p)} w_{pq}(D(p) - D(q))^2,$$

where p denotes a current pixel, P denotes a set of the plurality of first pixels, D(p) denotes the depth information of the pixel p in the processed image, N(p) denotes a first neighborhood of a pixel corresponding to the pixel p in the depth image having the second resolution, q denotes a pixel in the first neighborhood, $w_{pq}$ denotes the first weight, and D(q) denotes the depth information of the pixel q in the depth image having the second resolution. The first neighborhood is, for example, a 3*3 neighborhood. Of course, the first neighborhood may also be a 5*5 neighborhood, a 7*7 neighborhood, a 9*9 neighborhood or the like, and no specific limitation is made herein. $E_s(D)$ determines differences in color among pixels. The closer the color information of the current pixel and the pixel in the first neighborhood of the current pixel, the smaller the item is; otherwise the greater the item is.

In some implementations, the first weight is denoted by a formula of $w_{pq}=w_c w_s w_e w_d$, where $w_c$ denotes a color similarity, $w_s$ denotes a separation weight, $w_e$ denotes a salient edge weight, and $w_d$ denotes a higher-order linear interpolation weight.

In some implementations, the color similarity is denoted by a formula of $$w_c = \exp\left(-\sum_{I \in YUV} \frac{(I(p) - I(q))^2}{2\sigma_I^2}\right),$$

where I denotes luminance (Y), chromaticity (U) or density (V) of YUV space, I(p) denotes color information of pixel p in the processed image, I(q) denotes color information of the pixel q in the processed image, and $\sigma_I$ denotes a preset constant. $\sigma_I$ may be obtained based on experiments and pre-stored in a relevant storage element. In this embodiment of the present disclosure, I is the chromaticity of the YUV space, that is, I(p) is the chromaticity of the pixel p, and I(q) is the chromaticity of the pixel q in the processed image. The difference between I(p) and I(q) represents the closeness in colors.

In some implementations, the separation weight is denoted by a formula of $w_s=t_{se}$, where $t_{se}$ denotes a preset constant. The separation weight indicates whether a pixel in a first neighborhood of a pixel in the depth image is still within the neighborhood of the pixel after upsampling. If so, $t_{se}=1$; otherwise a constant within the range [0, 1] is taken as a penalty item. In the process of upsampling, the $t_{se}$ is, for example, 0.7. Of course, $t_{se}$ may also be of another value, and no specific limitation is made herein.

In some implementations, the salient edge weight is denoted by a formula of $$w_e = \frac{1}{\sqrt{s_x(p)^2 + s_x(q)^2} + 1},$$

where $s_x(p)$ denotes a pixel value corresponding to the pixel p in an image obtained by applying Sobel operator to the color image in an X axis, and $s_x(q)$ denotes a pixel value corresponding to the pixel q in an image obtained by applying Sobel operator to the color image in an X axis. $w_e$ is employed to measure whether a pixel falls on an edge.

In some implementations, the higher-order linear interpolation weight is denoted by a formula of $$w_d = \exp\left(-\sum \frac{(D_g(p) - D_g(q))^2}{2\sigma_g^2}\right),$$

where $D_g(p)$ denotes a pixel value corresponding to the pixel p in an image obtained by applying Gaussian interpolation to the depth image having the first resolution, $D_g(q)$ denotes a pixel value corresponding to the pixel q in an image obtained by applying Gaussian interpolation to the depth image having the second resolution, and $\sigma_g$ denotes a preset constant. $\sigma_g$ may be obtained based on experiments and pre-stored in a relevant storage element.

In some implementations, the non-local average regularization item is denoted by a formula of $$E_{NLM}(D) = \sum_{p \in P} \sum_{r \in A(p)} k_{pr}(D(p) - D(r))^2,$$

where p denotes a current pixel, P denotes a set of the plurality of first pixels, D(p) denotes depth information of the pixel p in the processed image, A(p) denotes a second neighborhood of a pixel corresponding to the pixel p in the depth image having the second resolution, r denotes a pixel in the second neighborhood, $k_{pr}$ denotes the second weight, and D(r) is depth information of the pixel r in the depth image having the second resolution. $k_{pr}$ may be obtained based on experiments and pre-stored in a relevant storage element. The second neighborhood may be, for example, a 11*11 neighborhood. Of course, the second neighborhood may also be a 13*13 neighborhood, a 15*15 neighborhood, or the like. To maintain a local structure of the pixel and a neighborhood of the pixel, the second neighborhood is normally greater than or equal to the 11*11 neighborhood. $E_{NLM}(D)$ determines a structure difference among pixels. The item is relatively small when, for example, the pixels are all on an edge, or in the same smoothing area; otherwise, the item is relatively large.

It should be noted that in this implementation of the present disclosure, neither of the first neighborhood and the second neighborhood includes a central pixel. For example, when the first neighborhood is the neighborhood of the pixel p, the first neighborhood does not include the pixel p.

Referring to FIG. 11, in some implementations, the act in block 022 includes an act in the following block.

At block 0222, a minimum solution to the objective function is found with an optimization-problem solving algorithm to obtain the depth image having the second resolution.

Referring again to FIG. 3, in some implementations, the act in block 0222 may be realized by the calculation module 122. That is, the calculation module 122 may be configured to find a minimum solution to the objective function with an optimization-problem solving algorithm to obtain the depth image having the second resolution.

Referring again to FIG. 4, in some implementations, the act in block 0222 may be realized by the processor 200. That is, the processor 200 may be configured to find a minimum solution to the objective function with an optimization-problem solving algorithm to obtain the depth image having the second resolution.

In detail, the optimization-problem solving algorithm includes, for example, least squares method, first-order gradient, second-order gradient, and on the like. In this embodiment of the present disclosure, the optimization-problem solving algorithm is the least squares method. The operation of the least squares method is fast, so that the process of upsampling the depth image into the depth image having the second resolution takes less time, and further, real-time processing of the depth image may be realized, and thus a requirement of processing at least preset frames (for example, 30 frames) of depth images in one second may be satisfied.

Figure 13:
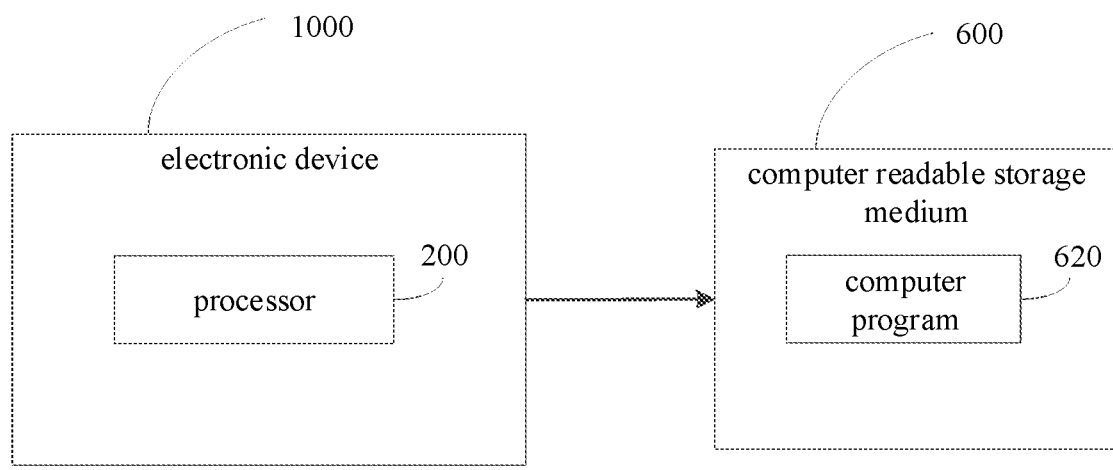
FIG. 13 is a schematic diagram of a connection of a computer readable storage medium and an electronic device according to some embodiments of the present disclosure.

Referring to FIG. 13, the present disclosure further provides a computer readable storage medium 600. The computer readable storage medium 600 includes a computer program 620 used in combination with the electronic device 1000. The computer program 620 may be executed by the processor 200 to implement the method for obtaining a depth image according to any one of the foregoing embodiments.

For example, in combination with FIG. 1 and FIG. 13, the computer program 620 may be executed by the processor 200 to perform acts in the following blocks.

At block 012, a depth image having a first resolution is mapped into a color image having a second resolution to obtain a processed image. The depth image and the color image correspond to the same scene. The first resolution is smaller than the second resolution. The processed image includes a plurality of first pixels and a plurality of second pixels. Each of the plurality of first pixels includes color information and depth information, and each of the plurality of second pixels includes color information. The depth information corresponds to the depth image having the first resolution. The color information corresponds to the color image.

At block 014, a data item of an objective function is determined based on the depth information of the plurality of first pixels in the processed image and depth information of a plurality of pixels corresponding to the plurality of first pixels in the depth image having the second resolution. The depth image having the second resolution includes depth information.

At block 016, a neighborhood smoothing item of the objective function is determined based on depth information of the plurality of first pixels in the processed image, and depth information of pixels in a first neighborhood corresponding to each of the plurality of first pixels in the depth image having the second resolution.

In an embodiment, the neighborhood smoothing item may be multiplied by a first weight. The first weight is determined based on the color information of the plurality of first pixels in the processed image and color information of pixels in the first neighborhood of each of the plurality of first pixels corresponding to each of the plurality of first pixels in the processed image.

At block 018, a non-local average regularization item of the objective function is determined based on depth information of the plurality of first pixels in the processed image, and depth information of pixels in a second neighborhood corresponding to each of the plurality of first pixels in the depth image having the second resolution.

At block 022, the objective function is solved to obtain the depth image having the second resolution.

For another example, in combination with FIG. 6 and FIG. 13, the computer program 620 may further be executed by the processor 200 to perform acts in the following blocks.

At block 024, one or more low-confidence pixels at edges of the depth image having the first resolution are acquired based on a confidence map.

At block 026, depth information of the one or more low-confidence pixels is removed.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for obtaining a depth image, comprising:
   mapping a depth image having a first resolution into a color image having a second resolution to obtain a processed image, the first resolution being smaller than the second resolution;
   establishing an objective function with respect to the processed image and a depth image having the second resolution, pixels in the processed image having one-to-one correspondence with pixels in the depth image having the second resolution, the objective function aiming to minimize an error with respect to the processed image and the depth image having the second resolution; and
   solving the objective function to obtain the depth image having the second resolution;
   wherein the processed image comprises a plurality of first pixels and a plurality of second pixels, each of the plurality of first pixels comprises color information and depth information, and each of the plurality of second pixels comprises color information,
   wherein determining the objective function with respect to the processed image and the depth image having the second resolution comprises:
      determining a data item of the objective function based on depth information of the plurality of first pixels in the processed image and depth information of a plurality of pixels corresponding to the plurality of first pixels in the depth image having the second resolution;
      determining a neighborhood smoothing item of the objective function based on depth information of the plurality of first pixels in the processed image, and depth information of pixels in a first neighborhood corresponding to each of the plurality of first pixels in the depth image having the second resolution; and
      determining a non-local average regularization item of the objective function based on depth information of the plurality of first pixels in the processed image, and depth information of pixels in a second neighborhood corresponding to each of the plurality of first pixels in the depth image having the second resolution,
      the second neighborhood being greater than the first neighborhood.

2. The method of claim 1, further comprising:
   obtaining one or more low-confidence pixels at edges of the depth image having the first resolution based on a confidence map; and
   removing depth information of the one or more low-confidence pixels.

3. The method of claim 2, wherein the depth image having the first resolution is obtained by a time-of-flight camera component, the time-of-flight camera component is configured to sample repeatedly to obtain a plurality of phase maps, the depth image having the first resolution is obtained by processing the plurality of phase maps, and the method comprises:
   obtaining an average pixel value of corresponding pixels in the plurality of phase maps;
   obtaining an amplitude map based on a plurality of average pixel values; and
   filtering the amplitude map to obtain the confidence map.

4. The method of claim 2, wherein the depth image having the first resolution is obtained by a structured-light camera component, the structured-light camera component is configured to acquire a structured-light image, the depth image having the first resolution is obtained by processing the structured-light image, and the method comprises:
   obtaining a maximum pixel value in the structured-light image; and
   comparing each pixel value in the structured-light image with the maximum pixel value to obtain the confidence map.

5. The method of claim 1, wherein the objective function is denoted by a formula of:

$$E(D)=E_d(D)+\lambda_s E_s(D)+\lambda_N E_{NLM}(D),$$

where, E(D) denotes the objective function, $E_d(D)$ denotes the data item, $E_s(D)$ denotes the neighborhood smoothing item, $E_{NLM}(D)$ denotes the non-local average regularization item, $\lambda_s$ and $\lambda_N$ denote weights.

6. The method of claim 5, wherein the data item is denoted by a formula of:

$$E_d(D) = \sum_{p \in P}(D(p) - G(p))^2,$$

where, p denotes a current pixel, P denotes a set of the plurality of first pixels, D(p) denotes depth information of the pixel p in the processed image, G(p) denotes depth information of a pixel corresponding to the pixel p in the depth image having the second resolution.

7. The method of claim 5, wherein the neighborhood smoothing item is denoted by a formula of:

$$E_s(D) = \sum_{p \in P}\sum_{q \in N(p)} w_{pq}(D(p) - D(q))^2,$$

where, p denotes a current pixel, P denotes a set of the plurality of first pixels, D(p) denotes depth information of the pixel p in the processed image, N(p) denotes a first neighborhood of a pixel corresponding to the pixel p in the depth image having the second resolution, q denotes a pixel in the first neighborhood, $w_{pq}$ denotes a first weight, and D(q) denotes depth information of the pixel q in the depth image having the second resolution.

8. The method of claim 7, wherein the first weight is denoted by a formula of:

$$w_{pq}=w_c w_s w_e w_d,$$

where, $w_c$ denotes a color similarity, $w_s$ denotes a separation weight, $w_e$ denotes a salient edge weight, and $w_d$ denotes a higher-order linear interpolation weight;
the color similarity is denoted by a formula of $$w_c = \exp-\left(\sum_{l\in YUV} \frac{(I(p)-I(q))^2}{2\sigma_I^2}\right)$$

where I denotes luminance, chromaticity or density of YUV space, I(p) denotes color information of the pixel p in the processed image, I(q) denotes color information of the pixel q in the processed image, and $\sigma_I$ denotes a preset constant;
the separation weight is denoted by a formula of $w_s=t_{se}$, $t_{se}$ denotes a preset constant;
the salient edge weight is denoted by a formula of $$w_e = \frac{1}{\sqrt{s_x(p)^2+s_x(q)^2}+1},$$

where $s_x(p)$ denotes a pixel value corresponding to the pixel p in an image obtained by applying Sobel operator to the color image in an X axis, and $s_x(q)$ denotes a pixel value corresponding to the pixel q in an image obtained by applying Sobel operator to the color image in an X axis; and
the higher-order linear interpolation weight is denoted by a formula of $$w_d = \exp-\left(\sum \frac{(D_g(p)-D_g(q))^2}{2\sigma_g^2}\right),$$

where $D_g(p)$ denotes a pixel value corresponding to the pixel p in an image obtained by applying Gaussian interpolation to the depth image having the first resolution, $D_g(q)$ denotes a pixel value corresponding to the pixel q in an image obtained by applying Gaussian interpolation to the depth image having the second resolution, and $\sigma_g$ denotes a preset constant.

9. The method of claim 5, wherein the non-local average regularization item is denoted by a formula of:

$$E_{NLM}(D) = \sum_{p\in P}\sum_{r\in A(p)} k_{pr}(D(p)-D(r))^2,$$

where, p denotes a current pixel, P denotes a set of the plurality of first pixels, D(p) denotes depth information of the pixel p in the processed image, A(p) denotes a second neighborhood of a pixel corresponding to the pixel p in the depth image having the second resolution, r denotes a pixel in the second neighborhood, $k_{pr}$ denotes a second weight, and D(r) is depth information of the pixel r in the depth image having the second resolution.

10. The method of claim 1, wherein solving the objective function to obtain the depth image having the second resolution comprises:
finding a minimum solution to the objective function with an optimization-problem solving algorithm to obtain the depth image having the second resolution.

11. An electronic device, comprising:
a memory configured to store instructions; and
a processor configured to read the instructions to carry out the following acts:
mapping a depth image having a first resolution into a color image having a second resolution to obtain a processed image, the first resolution being smaller than the second resolution;
establishing an objective function with respect to the processed image and a depth image having the second resolution, pixels in the processed image having one-to-one correspondence with pixels in the depth image having the second resolution, the objective function aiming to minimize an error with respect to the processed image and the depth image having the second resolution; and
solving the objective function to obtain the depth image having the second resolution;
wherein the processed image comprises a plurality of first pixels and a plurality of second pixels, each of the plurality of first pixels comprises color information and depth information, and each of the plurality of second pixels comprises color information,
wherein determining the objective function with respect to the processed image and the depth image having the second resolution comprises:
determining a data item of the objective function based on depth information of the plurality of first pixels in the processed image and depth information of a plurality of pixels corresponding to the plurality of first pixels in the depth image having the second resolution;
determining a neighborhood smoothing item of the objective function based on depth information of the plurality of first pixels in the processed image, and depth information of pixels in a first neighborhood corresponding to each of the plurality of first pixels in the depth image having the second resolution; and
determining a non-local average regularization item of the objective function based on depth information of the plurality of first pixels in the processed image, and depth information of pixels in a second neighborhood corresponding to each of the plurality of first pixels in the depth image having the second resolution,
the second neighborhood being greater than the first neighborhood.

12. The electronic device of claim 11, wherein the processor is configured to carry out the following acts:
obtaining one or more low-confidence pixels at edges of the depth image having the first resolution based on a confidence map; and
removing depth information of the one or more low-confidence pixels.

13. The electronic device of claim 12, wherein the depth image having the first resolution is obtained by a time-of-flight camera component, the time-of-flight camera component is configured to sample repeatedly to obtain a plurality of phase maps, the depth image having the first resolution is obtained by processing the plurality of phase maps, and the processor is configured to carry out the following acts:

obtaining an average pixel value of corresponding pixels in the plurality of phase maps;

obtaining an amplitude map based on a plurality of average pixel values; and filtering the amplitude map to obtain the confidence map, or wherein the depth image having the first resolution is obtained by a structured-light camera component, the structured-light camera component is configured to acquire a structured-light image, the depth image having the first resolution is obtained by processing the structured-light image, and the processor is configured to carry out the following acts:

obtaining a maximum pixel value in the structured-light image; and comparing each pixel value in the structured-light image with the maximum pixel value to obtain the confidence map.

14. The electronic device of claim 11, wherein the objective function is denoted by a formula of:

$$E(D)=E_d(D)+\lambda_s E_s(D)+\lambda_N E_{NLM}(D),$$

where, $E(D)$ denotes the objective function, $E_d(D)$ denotes the data item, $E_s(D)$ denotes the neighborhood smoothing item, $E_{NLM}(D)$ denotes the non-local average regularization item, $\lambda_s$ and $\lambda_N$ denote weights.

15. The electronic device of claim 14, wherein the data item is denoted by a formula of:

$$E_d(D) = \sum_{p \in P} (D(p) - G(p))^2,$$

where, p denotes a current pixel, P denotes a set of the plurality of first pixels, D(p) denotes depth information of the pixel p in the processed image, G(p) denotes depth information of a pixel corresponding to the pixel p in the depth image having the second resolution.

16. The electronic device of claim 14, wherein the neighborhood smoothing item is denoted by a formula of:

$$E_s(D) = \sum_{p \in P} \sum_{q \in N(p)} w_{pq}(D(p) - D(q))^2,$$

where, p denotes a current pixel, P denotes a set of the plurality of first pixels, D(p) denotes depth information of the pixel p in the processed image, N(p) denotes a first neighborhood of a pixel corresponding to the pixel p in the depth image having the second resolution, q denotes a pixel in the first neighborhood, $w_{pq}$ denotes a first weight, and D(q) denotes depth information of the pixel q in the depth image having the second resolution.

17. The electronic device of claim 14, wherein the non-local average regularization item is denoted by a formula of:

$$E_{NLM}(D) = \sum_{p \in P} \sum_{r \in A(p)} k_{pr}(D(p) - D(r))^2,$$

where, p denotes a current pixel, P denotes a set of the plurality of first pixels, D(p) denotes depth information of the pixel p in the processed image, A(p) denotes a second neighborhood of a pixel corresponding to the pixel p in the depth image having the second resolution, r denotes a pixel in the second neighborhood, $k_{pr}$ denotes a second weight, and D(r) is depth information of the pixel r in the depth image having the second resolution.

18. A non-transitory computer readable storage medium, comprising a computer program used in combination with an electronic device, the computer program being executable by a processor of the electronic device to implement:

mapping a depth image having a first resolution into a color image having a second resolution to obtain a processed image, the first resolution being smaller than the second resolution;

establishing an objective function with respect to the processed image and a depth image having the second resolution, pixels in the processed image having one-to-one correspondence with pixels in the depth image having the second resolution, the objective function aiming to minimize an error with respect to the processed image and the depth image having the second resolution; and solving the objective function to obtain the depth image having the second resolution;

wherein the processed image comprises a plurality of first pixels and a plurality of second pixels, each of the plurality of first pixels comprises color information and depth information, and each of the plurality of second pixels comprises color information, wherein determining the objective function with respect to the processed image and the depth image having the second resolution comprises:

determining a data item of the objective function based on depth information of the plurality of first pixels in the processed image and depth information of a plurality of pixels corresponding to the plurality of first pixels in the depth image having the second resolution;

determining a neighborhood smoothing item of the objective function based on depth information of the plurality of first pixels in the processed image, and depth information of pixels in a first neighborhood corresponding to each of the plurality of first pixels in the depth image having the second resolution; and determining a non-local average regularization item of the objective function based on depth information of the plurality of first pixels in the processed image, and depth information of pixels in a second neighborhood corresponding to each of the plurality of first pixels in the depth image having the second resolution, the second neighborhood being greater than the first neighborhood.

19. The non-transitory computer readable storage medium of claim 18, wherein the objective function is denoted by a formula of:

$$E(D)=E_d(D)+\lambda_s E_s(D)+\lambda_N E_{NLM}(D),$$

where, $E(D)$ denotes the objective function, $E_d(D)$ denotes the data item, $E_s(D)$ denotes the neighborhood smoothing item, $E_{NLM}(D)$ denotes the non-local average regularization item, $\lambda_s$ and $\lambda_N$ denote weights.

20. The non-transitory computer readable storage medium of claim 18, wherein solving the objective function to obtain the depth image having the second resolution comprises:
  finding a minimum solution to the objective function with an optimization-problem solving algorithm to obtain the depth image having the second resolution.

* * * * *